US011739568B2

(12) United States Patent
Penny et al.

(10) Patent No.: US 11,739,568 B2
(45) Date of Patent: Aug. 29, 2023

(54) APPARATUSES THAT SECURE LAPTOPS TO DISPLAY SURFACES

(71) Applicant: OnQ Solutions, Inc., Hayward, CA (US)

(72) Inventors: Steven D. Penny, Oakland, CA (US); Paul F. Chapuis, Woodside, CA (US)

(73) Assignee: OnQ Solutions, Inc., Hayward, CA (US)

(*) Notice: Subject to any disclaimer, the term of this patent is extended or adjusted under 35 U.S.C. 154(b) by 81 days.

(21) Appl. No.: 17/385,610

(22) Filed: Jul. 26, 2021

(65) Prior Publication Data

US 2023/0028193 A1    Jan. 26, 2023

(51) Int. Cl.
*F16M 11/10* (2006.01)
*E05B 73/00* (2006.01)
*F16M 11/20* (2006.01)

(52) U.S. Cl.
CPC .......... *E05B 73/0082* (2013.01); *F16M 11/10* (2013.01); *F16M 11/2014* (2013.01)

(58) Field of Classification Search
CPC ... E05B 73/0082; F16M 11/10; F16M 11/2014; A47F 7/024; A47F 7/0246; A47F 5/0861; F16M 2200/02
See application file for complete search history.

(56) References Cited

U.S. PATENT DOCUMENTS

| | | | |
|---|---|---|---|
| 5,673,628 A | 10/1997 | Boos | |
| 6,220,556 B1 | 4/2001 | Sohrt et al. | |
| 6,386,413 B1 | 5/2002 | Twyford | |
| 6,700,488 B1 | 3/2004 | Leyden et al. | |
| 7,187,283 B2 | 3/2007 | Leyden et al. | |
| 8,061,164 B2 | 11/2011 | Johnston et al. | |
| 8,191,851 B2 | 6/2012 | Crown | |
| 8,360,373 B2 | 1/2013 | Johnson et al. | |

(Continued)

FOREIGN PATENT DOCUMENTS

WO    2019/213490 A1    11/2019

OTHER PUBLICATIONS

DONGGUAN COMER ELECTRONIC TECHNOLOGY CO., LTD., "Comer Anti-Theft Locking Laptop Mechanical Security Display Frame For Mobile Phone Stores", http://www.comerdisplay.com/sale-8024631-comer-anti-theft-locking-laptop-mechanical-security-display-frame-for-mobile-phone-stores.html, downloaded on Jun. 11, 2018.

(Continued)

*Primary Examiner* — Terrell L McKinnon
*Assistant Examiner* — Jerry Nmn Olivier
(74) *Attorney, Agent, or Firm* — Vierra Magen Marcus LLP

(57) ABSTRACT

A security apparatus secures a laptop, and particularly a convertible laptop, to a mounting surface. The security apparatus comprises a housing assembly, and a first arm assembly and a second arm assembly extending from and retractable into the housing assembly. A first end assembly and second end assembly are mounted to the first arm assembly, and a second end assembly. Each arm assembly secures a first side and a second side of a lower body portion of the laptop. A trapping member is positioned in the housing assembly to lock the arm assemblies. A locking rod has a first end extending outside the support housing and a second end extending into the housing assembly and into engagement with the trapping member, the locking rod configured to move the trapping member into engagement with the first and second arm assemblies.

20 Claims, 11 Drawing Sheets

(56) References Cited

U.S. PATENT DOCUMENTS

| | | | |
|---|---|---|---|
| 8,701,452 | B2 | 4/2014 | Foster et al. |
| 8,814,128 | B2 | 8/2014 | Trinh et al. |
| 8,833,716 | B2 | 9/2014 | Funk et al. |
| 8,864,089 | B2 | 10/2014 | Hung |
| 8,925,886 | B2 | 1/2015 | Sears |
| 8,985,544 | B1 | 3/2015 | Gulick, Jr. |
| 8,998,048 | B1 | 4/2015 | Wu |
| 9,022,337 | B2 | 5/2015 | Petruskavich |
| 9,039,785 | B2 | 5/2015 | Gulick, Jr. |
| 9,097,380 | B2 | 8/2015 | Wheeler |
| 9,117,351 | B2 | 8/2015 | Gulick, Jr. et al. |
| 9,159,309 | B2 | 10/2015 | Liu et al. |
| 9,161,466 | B2 | 10/2015 | Huang |
| 9,285,832 | B2 | 3/2016 | Galant |
| 9,567,776 | B2 | 2/2017 | Moock et al. |
| 9,568,141 | B1 | 2/2017 | Zaloom |
| 9,714,528 | B2 | 7/2017 | Van Balen |
| 9,936,823 | B2 | 4/2018 | Galant |
| 9,955,598 | B1* | 4/2018 | Wen et al. ........... H05K 5/0204 |
| 10,165,873 | B2 | 1/2019 | Gulick, Jr. et al. |
| 10,323,440 | B1 | 6/2019 | Kelsch et al. |
| 10,378,248 | B1 | 8/2019 | Kelsch et al. |
| 10,448,759 | B1 | 10/2019 | Chapuis et al. |
| 10,646,055 | B2 | 5/2020 | Chapuis et al. |
| 11,045,019 | B2 | 6/2021 | Chapuis et al. |
| 11,363,895 | B2 | 6/2022 | Schuft et al. |
| 11,412,865 | B2 | 8/2022 | Chapuis et al. |
| 11,432,663 | B2 | 9/2022 | Chapuis et al. |
| 2007/0034753 | A1 | 2/2007 | Lee |
| 2010/0079285 | A1 | 4/2010 | Fawcett et al. |
| 2010/0108828 | A1 | 5/2010 | Yu et al. |
| 2010/0148030 | A1 | 6/2010 | Lin |
| 2012/0037783 | A1 | 2/2012 | Alexander et al. |
| 2012/0234055 | A1 | 9/2012 | Bland, III et al. |
| 2013/0301216 | A1 | 11/2013 | Trinh et al. |
| 2013/0318639 | A1 | 11/2013 | Gulick, Jr. |
| 2014/0060218 | A1 | 3/2014 | Bisesti et al. |
| 2015/0089675 | A1 | 3/2015 | Gulick, Jr. |
| 2015/0108948 | A1 | 4/2015 | Gulick, Jr. et al. |
| 2015/0196140 | A1 | 7/2015 | Lin |
| 2015/0300050 | A1 | 10/2015 | Van Balen |
| 2017/0049251 | A1 | 2/2017 | Gulick, Jr. et al. |
| 2017/0188724 | A1 | 7/2017 | Lin |
| 2018/0058107 | A1 | 3/2018 | Lucas et al. |
| 2018/0279805 | A1* | 10/2018 | Galant ................ F16M 11/041 |
| 2018/0279809 | A1 | 10/2018 | Regan et al. |
| 2019/0316386 | A1 | 10/2019 | Gulick, Jr. et al. |
| 2020/0008589 | A1 | 1/2020 | Chapuis et al. |
| 2020/0107653 | A1* | 4/2020 | Leyden et al. ........... F16B 2/12 |
| 2020/0271266 | A1 | 8/2020 | Gulick, Jr. et al. |
| 2021/0015274 | A1 | 1/2021 | Chapuis et al. |
| 2021/0059437 | A1 | 3/2021 | Chapuis et al. |
| 2021/0164603 | A1 | 6/2021 | Chapuis et al. |
| 2021/0307543 | A1 | 10/2021 | Chapuis et al. |
| 2021/0355714 | A1 | 11/2021 | Chapuis et al. |
| 2022/0396976 | A1 | 12/2022 | Chapuis et al. |
| 2022/0412129 | A1 | 12/2022 | Chapuis et al. |

OTHER PUBLICATIONS

DONGGUAN COMER ELECTRONIC TECHNOLOGY CO., LTD., "COMER Universal Display Mechanical Anti-Theft Security Display Locking System For Tablet Brackets", http://www.smartcomer.com/sale-8028445-comer-universal-display-mechanical-anti-theft-security-display-locking-system-for-tablet-brackets.html, downloaded on Jun. 11, 2018.

GRIPZO, "iPad Enclosure", https://www.gripzo.com/en/products/tablets/ipad-enclosure, downloaded on Jun. 11, 2018.

GRIPZO, "iPhone", https://www.gripzo.com/en/products/smart phones/iphone, downloaded on Jun. 11, 2018.

GRIPZO, "Universal Smartphone Grip/ Universal Tablet Grip", https://www.gripzo.com/en/products/smartphones/phone, downloaded on Jun. 14, 2018.

RTF, "Smartphones - Samsung Note 3, LG Flex, HTC One, Apple iPhone 5, Blackberry Z10", http://www.rtfglobal.com/solutions/by-devices-type/smartphones/#!prettyPhoto, downloaded on Jun. 11, 2018.

RTF, "Vise- Securely And Attractively Placing Your Product First", http://www.rtfglobal.com/products/vise-cell-phone-security/, downloaded on Jun. 11, 2018.

SCORPION SECURITY PRODUCTS, "4-Point ERS Phone Scorpion", https://www.scorpionsecurityproducts.com/product/4-point-ers-phone-scorpion/, downloaded on Jun. 11, 2018.

SCORPION SECURITY PRODUCTS, "4-Point ERS Small Tablet Scorpion", https://www.scorpionsecurityproducts.com/product/4-point-ers-small-tablet-scorpion/, downloaded on Jun. 11, 2018.

* cited by examiner

APPARATUSES THAT SECURE LAPTOPS TO DISPLAY SURFACES

FIELD OF TECHNOLOGY

Embodiments of the present technology relate to apparatuses that secure laptops to display surfaces.

BACKGROUND

Laptops are generally displayed in retail stores on display tables in such a way that allows users to inspect and evaluate the laptop, both with respect to its physical look and feel, as well as its operation. Since laptops are costly, it would be preferable if they could be secured to the display surface to prevent theft. While there are currently some security apparatuses available to securely display laptops in retail stores, it would be beneficial to provide an improved laptop security apparatus.

Laptops, as the term is used herein, include notebook computers, and convertible notebook computers. A convertible laptop typically includes a lower body portion (that includes a keyboard) and an upper body portion (that includes a display screen) that are attached to one another by a hinge. The hinge allows the laptop to selectively be put in either a closed position or an open position. In a convertible laptop, the upper portion can rotate about the hinge by nearly 360°, from a closed position (where the display is adjacent to and nearly abutting the keyboard), to a position where the back of the upper body portion abuts the opposite side of the lower body portion. This allows a convertible laptop to "convert" to resemble a tablet computer, along with other configurations.

SUMMARY

A security apparatus of the present technology is configured to secure a secured object on a mounting surface. The security apparatus comprises a housing assembly, and a first arm assembly and a second arm assembly extending from and retractable into the housing assembly. The security apparatus also includes a first end assembly mounted to the first arm assembly, and a second end assembly mounted to the second arm assembly, each arm assembly configured to receive a first side and a second side of a lower body portion of a secured object, each end assembly including a channel having an arcuate top portion sized for placement between an upper body portion and the lower body portion of the secured object. The security apparatus includes a support housing supporting the housing assembly, first and second arm assemblies, and first and second end assemblies on the mounting surface. The security apparatus also includes a trapping member positioned in the housing assembly. The security apparatus includes a locking rod having a first end extending outside the support housing and a second end extending into the housing assembly and into engagement with the trapping member, the locking rod configured to move the trapping member into engagement with the first and second arm assemblies.

Embodiments include a security apparatus where the locking rod is configured to move the trapping member into engagement with the first arm assembly and the second arm assembly when the locking rod is rotated. Embodiments include a security apparatus where the locking rod includes a threaded region extending from the second end toward the first end, the threaded region received in a threaded bore in the housing assembly, the threaded bore being adjacent to the trapping member, the second end of the locking rod extending though the threaded bore into a guide tube on the trapping member. Embodiments include a security apparatus where the first end of the locking rod extends below a bottom side of the mounting surface and includes a paddle. Embodiments include a security apparatus where each arm assembly includes an arm channel and a threaded rod associated with the arm channel, and where the housing assembly includes a guide rail, each arm assembly being slidably received into the housing assembly though a hole in the housing assembly and along the guide rail. Embodiments include a security apparatus where the trapping member may include a trapping rail including a first coupling nut and a second coupling nut, the first coupling nut attached to the trapping rail at a first end of the trapping rail and the second coupling nut attached to the trapping rail at a second end of the trapping rail, each coupling nut including a concave threaded region having a pitch matching a pitch of each threaded rod. Embodiments include a security apparatus where each end assembly includes a u-shaped channel member defining the channel and including the arcuate top portion, and a corner member having a u-shaped cross-section oriented 90 degrees relative to the u-shaped channel member and surrounding the channel member, the corner member forming a wall positioned to engage one of the first side or the second side of the lower body region. Embodiments include a security apparatus where the locking rod is positioned within the support housing.

Another aspect includes a security apparatus configured to secure a convertible laptop to a surface. The security apparatus includes a securing assembly may include first and second arm assemblies each having an end assembly configured to receive a first side and a second side of the lower body portion of the laptop, each end assembly including a channel having an arcuate top portion sized for placement within a gap between an upper body portion and the lower body portion of the laptop. The security apparatus includes a locking assembly engaging the securing assembly, the locking assembly may include: a trapping member positioned adjacent to at least a portion of the first and second arm assemblies; and a locking rod having a first end extending below the surface and a second end extending into engagement with the trapping member, the locking rod configured to move the trapping member into engagement with the first and second arm assemblies.

One general aspect includes a security apparatus configured to secure a laptop on a display surface for the laptop The security apparatus includes a housing and a first arm and a second arm extending from and retractable into the housing, the first arm including a first threaded rod, the second arm including a second threaded rod. The apparatus also includes a first end channel mounted to the first arm, and a second end channel mounted to the second arm, the first end channel configured to receive a first side a lower body portion of the laptop, the second end channel configured to receive a second side of the lower body portion of the laptop, each channel an arcuate upper portion sized for placement between and upper body portion of the laptop and the lower body portion of the laptop. The apparatus also includes a base supporting the housing, first and second arms, and first and second end channels on the mounting surface. The apparatus also includes a trapping member positioned in the housing, the trapping member may include a trapping rail including a first coupling nut and a second coupling nut, the first coupling nut attached to the trapping rail at a first end of the trapping rail and the second coupling nut attached to the trapping rail at a second end of the trapping rail, each coupling nut including a concave threaded region having a pitch matching a pitch of each threaded rod. The apparatus also includes a locking rod having a first end extending outside the housing and below the mounting surface and a second end extending into the housing and into engagement with the trapping member, the locking rod configured to move the trapping member into engagement with the first and second arms.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The benefits, features, and advantages of the various embodiments of the present technology will become better understood with regard to the following description and accompanying drawings. The following description is presented to enable one of ordinary skill in the art to make and use embodiments of the present technology as provided within the context of a particular application and its requirements. Various modifications to the embodiments described herein will, however, be apparent to one skilled in the art, and the general principles defined herein may be applied to other embodiments. Therefore, the embodiments of the present invention are not intended to be limited to the particular embodiments shown and described herein, but are to be accorded the widest scope consistent with the principles and novel features herein disclosed.

A security apparatus which may be used to secure and display a laptop computer or other secured body on a surface is described herein. The apparatus is useful in retail displays of laptops, allowing people to view and interact with a laptop while keeping the laptop secure against theft. The apparatus is configured to allow a convertible laptop, in which a top portion of the laptop can be rotated nearly 360 degrees between a closed position adjacent to a keyboard on a lower portion of the laptop, and a position where the top portion is adjacent to a back side of the lower potion so that the laptop resembled a tablet computer, to be so rotated while secured in the apparatus. This allows people viewing the laptop in the security apparatus to have a better viewing experience in a retail environment.

The security apparatus allows locking of the laptop within the apparatus using a locking rod which is controlled from a position below the mounting surface on which the security apparatus is provided. A person mounting the laptop in the security apparatus can secure and remove the lock on the laptop by simply rotating the locking rod which is out of sight from people viewing the laptop.

Figure 1:
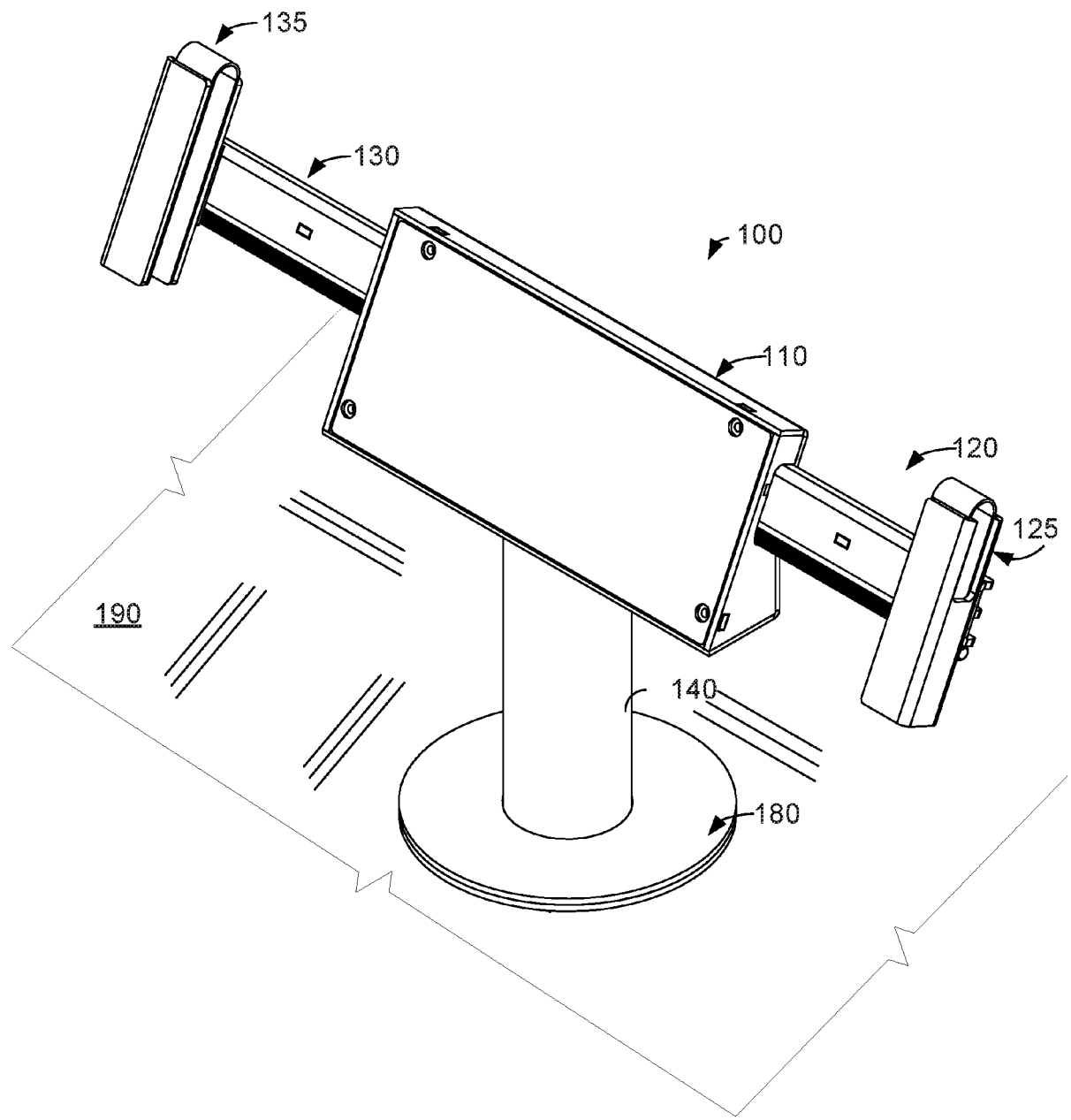
FIG. 1 is orthogonal perspective view of a security apparatus according to an embodiment of the present technology.
Figure 2:
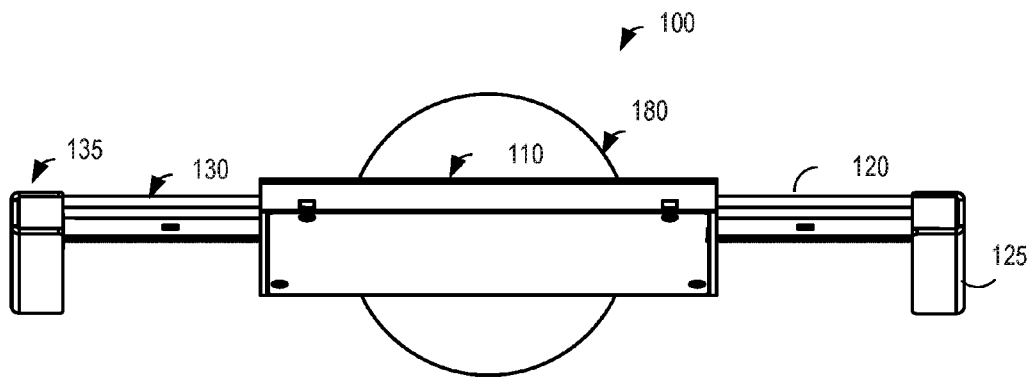
FIG. 2 is a top view of the security apparatus (along line 2 – 2 of FIG. 3) according to an embodiment of the present technology.

FIG. 1 is orthogonal perspective view of a security apparatus 100 according to an embodiment of the present technology. FIG. 2 is a top perspective view, FIG. 3 a front view and FIG. 4 a side view of the security apparatus 100 according to an embodiment of the present technology. The security apparatus 100 is used to secure a laptop (500), and in particular a convertible laptop, to a body 190 such as table, counter or other planar element, to allow display and interaction with the laptop while preventing theft of the laptop. The technology of the security apparatus discussed herein may be utilized to secure object other than a laptop, and in general, the object secured by the security apparatus 100 may be referred to herein as a "secured object."

As illustrated in FIGS. 1 through 4, the major components of the security apparatus 100 include housing assembly 110, arm assemblies 120 and 130 each having a respective end assembly 125, 135 attached thereto, a post 140, and a mount assembly 180. Together, the housing assembly, arm assemblies and end assemblies form a securing assembly. Post 140 and mount assembly 180 support the securing assembly above a body 190, and may be referred to herein as a support assembly. The mount assembly 180 is utilized to secure the security apparatus 100 to a body 190. Body 190 may comprise a table, or other flat structure suitable for supporting the security apparatus 100 and a laptop therein. Post 140 extends between the mount assembly 180 and the housing assembly 110, and thus supports the weight of the secured object positioned in the security apparatus 100. Post 140 houses a disc of the mount assembly 180 and the locking rod 325 (both discussed below) and thus may referred to herein as a "support housing".

Figure 3:
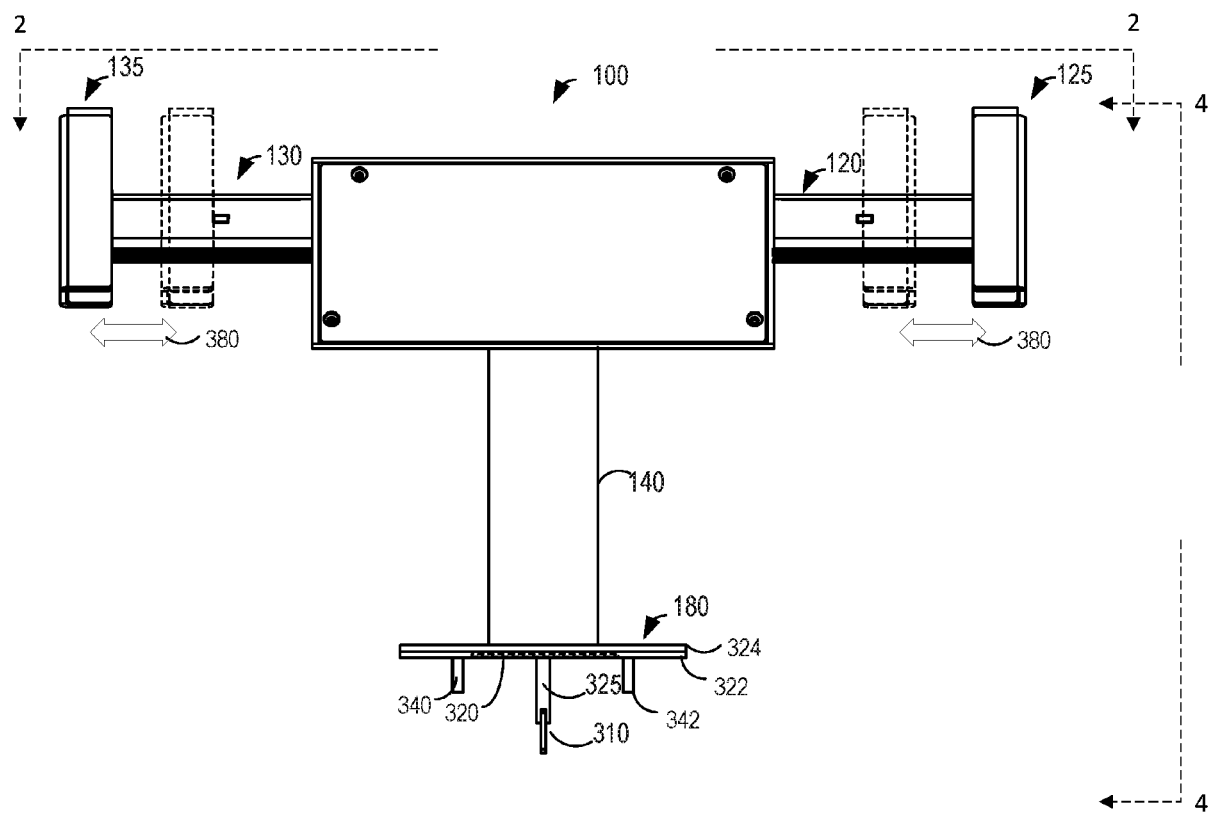
FIG. 3 is a front view of the security apparatus according to an embodiment of the present technology.
Figure 5:
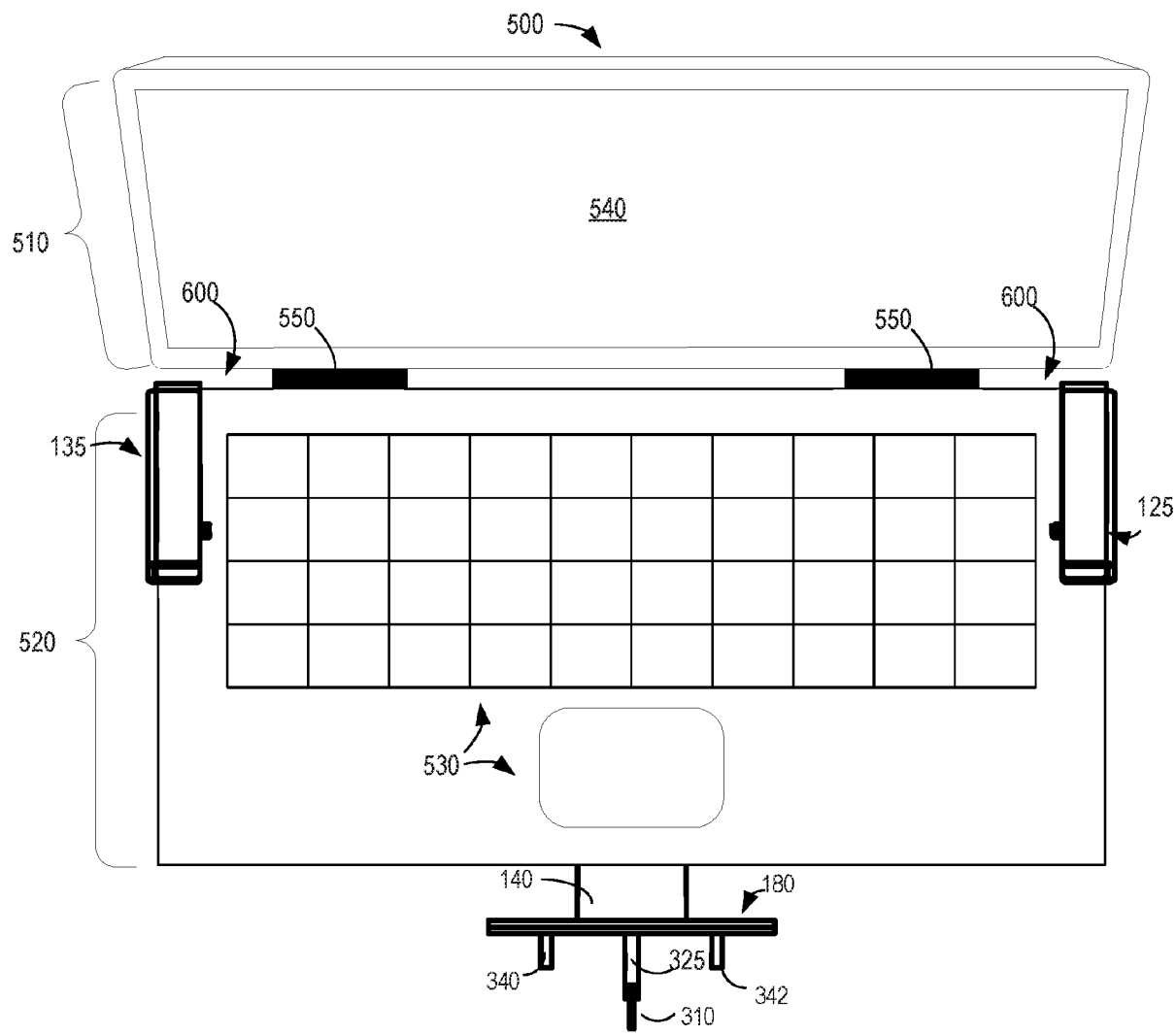
FIG. 5 is a front view of the security apparatus according to an embodiment of the present technology showing a laptop computer mounted therein.

Arm assemblies 120, 130 are configured to extend from and retract into housing assembly 110. The extension and retraction of the arm assemblies 120, 130 is illustrated in FIG. 3. Each arm assembly 120, 130 may extend from and retract into the housing assembly 110 along the direction of arrows 380 shown in FIG. 3. This allows end assemblies 125, 135 attached thereto to be fitted into engagement with a lower body portion of different sizes of laptops and secure the laptop (as illustrated in FIG. 5) once the assemblies 120, 130 are locked in place as described herein. Each end assembly 125, 135, mounted to arm assembly 120, 130, can secure one side of a secured object, such that a secured object becomes secured in the security assembly when opposing sides of the secured object are sandwiched between the end assemblies 125, 135. As discussed below, each arm assembly 120, 130 can be easily locked in place using a locking assembly comprising an internal trap rail (750) and a securing rod (325). In a unique aspect of the apparatus, locking assembly is controlled by rotating the securing rod to lock the trap rail from a position below the body 190 by rotating the securing rod as described herein. Locking of the laptop in the security apparatus 100 is thereby controlled from a position which is hidden from the typical view of anyone viewing the laptop in the security apparatus.

FIG. 5 illustrates a secured object such as a laptop 500 positioned in the security apparatus 100. FIG. 5 shows a laptop computer 500 having an upper body portion 510 and a lower body portion 520. The upper body portion may include a display 540 on one side thereof (i.e., a "front side"). The lower body portion may include a keyboard and trackpad 530 on one side thereof (i.e., a "top side"). The upper body portion 510 and lower body portion 520 may be connected by one or more hinges or hinge assemblies 550. As noted above, the upper body portion can rotate about one or more hinge assemblies 550 to allow positioning of the upper body portion 510 at various angles relative to the lower body portion 520. In one position, illustrated in FIG. 5, the top portion 510 may be rotated away from, and positioned at an angle (illustrated in FIG. 6) relative to, the bottom portion 520 so that the laptop is considered to be in an "open" position, allowing a user to view the display 540 and access the keyboard/trackpad 530. In another position, the display-side (front) surface of the upper body portion may be rotated to a position abutting the keyboard (top) side of the lower portion thereby abutting the keyboard/trackpad, so that the laptop is in a "closed" position. As noted above, a convertible laptop computer may have hinges 550 which allow the upper body portion 510 to rotate nearly 360° about the hinges 550 so that the side of the upper body portion 510 opposing the display 540 (i.e., a "back side" of the upper body potion 510) abuts a side of the lower body portion 520 opposing the keyboard/trackpad 530 (i.e., a "bottom side" of the lower body portion 520). In this position, a laptop resembles a "tablet" computer.

One difficulty with prior art laptop display apparatuses is that they do not allow one to view a convertible laptop in this tablet position where the back side of the upper body portion is positioned adjacent to the bottom side of the lower body portion. The present security apparatus 100 solves this problem while providing a secure means for displaying a convertible laptop (or non-convertible laptop or other secured object).

Figure 6:
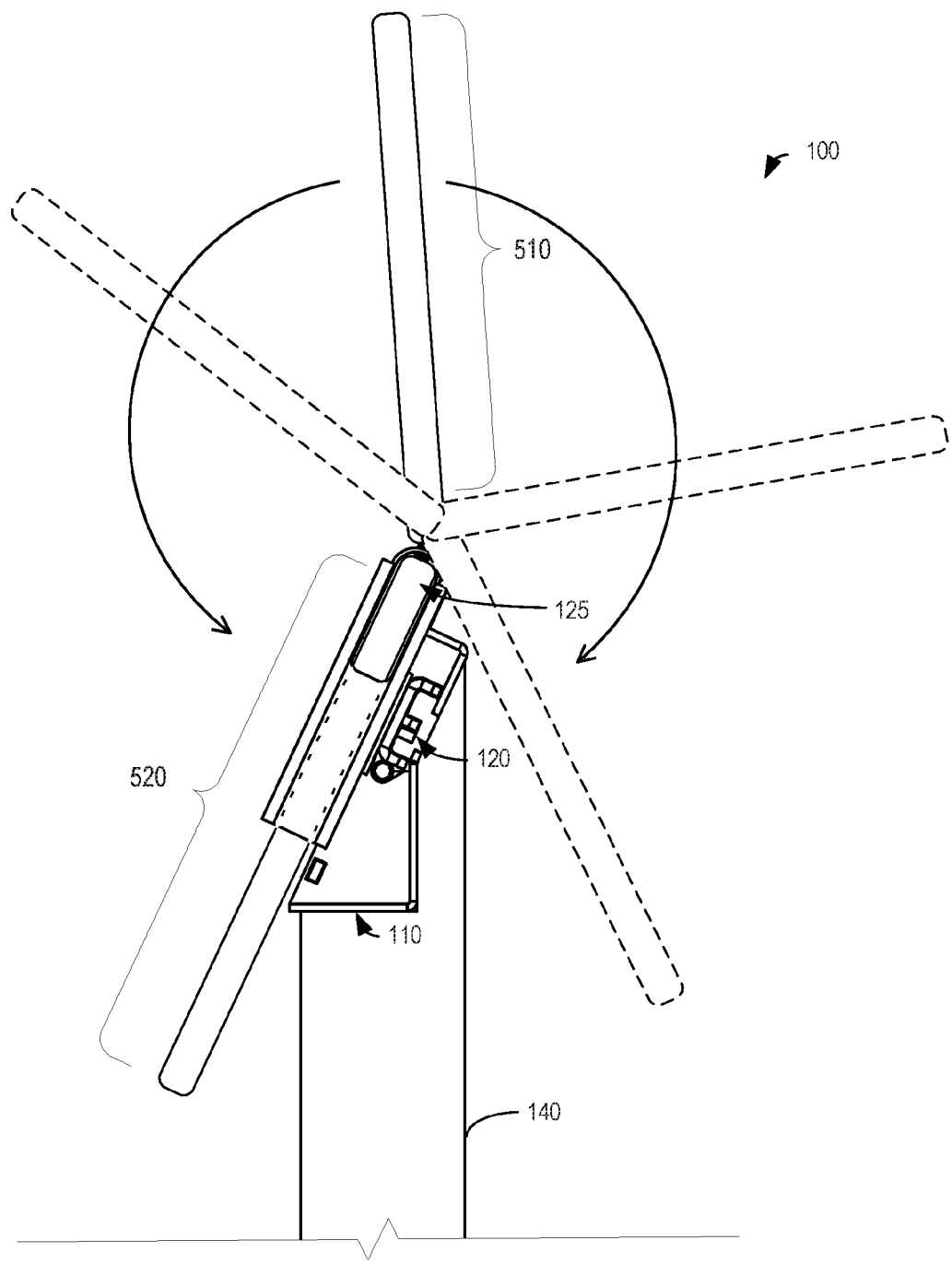
FIG. 6 is a side view of the security apparatus according to an embodiment of the present technology showing the laptop computer of FIG. 5 rotatable about a hinge of the laptop while secured in the security apparatus.

FIG. 6 is a side view of the security apparatus 100 according to an embodiment showing the secured object in the form of the laptop computer 500 of FIG. 5 which is secured in the security apparatus 100. As illustrated therein, the laptop 500 is in an angled or "open" position, with the upper body portion being rotatable about its hinges while the lower body portion is in the security apparatus 100.

In a unique aspect, the security apparatus 100 described herein allows the upper body portion 510 of a convertible laptop to rotate while secured in the apparatus between the end assemblies 125, 135 such that the upper body portion 510 can be positioned between the "closed" position and a fully rotated position where the back surface of the top portion abuts the bottom side of the lower body portion 520. As illustrated in FIG. 6, the respective end assemblies 125 and 135 engage sides of the lower body portion 520. Each end assembly includes an arm channel (1150, described with respect to FIGS. 11) having an arcuate upper portion which can be positioned between the lower body portion 520 and the upper body portion 510, in a gap 600 between the upper body portion 510 and lower body portion 520. In order to allow for convertible laptops to rotate their upper body portion 360° about the hinges, most convertible laptops have hinges which allow the upper body portion 510 to extend away from the lower body portion 520 during rotation, forming the gap 600. In order to secure the laptop in the security apparatus 100, the lower body portion 520 of the laptop 500 is centered on the housing assembly 110 with the end assemblies 125, 135 spaced apart on either side of the lower body portion 520. The end assemblies 125, 135 are then slid into engagement with the respective sides of lower body portion 520, with the upper portion of the arm channel 1150 positioned in the gap 600 between the upper and lower body portions. The respective end assemblies 125 and 135 are secured in place by locking assembly as will be described below. The upper body portion 510 can then be rotated with respect to the lower body portion 520 by persons viewing the laptop in the security apparatus 100.

Figure 7:
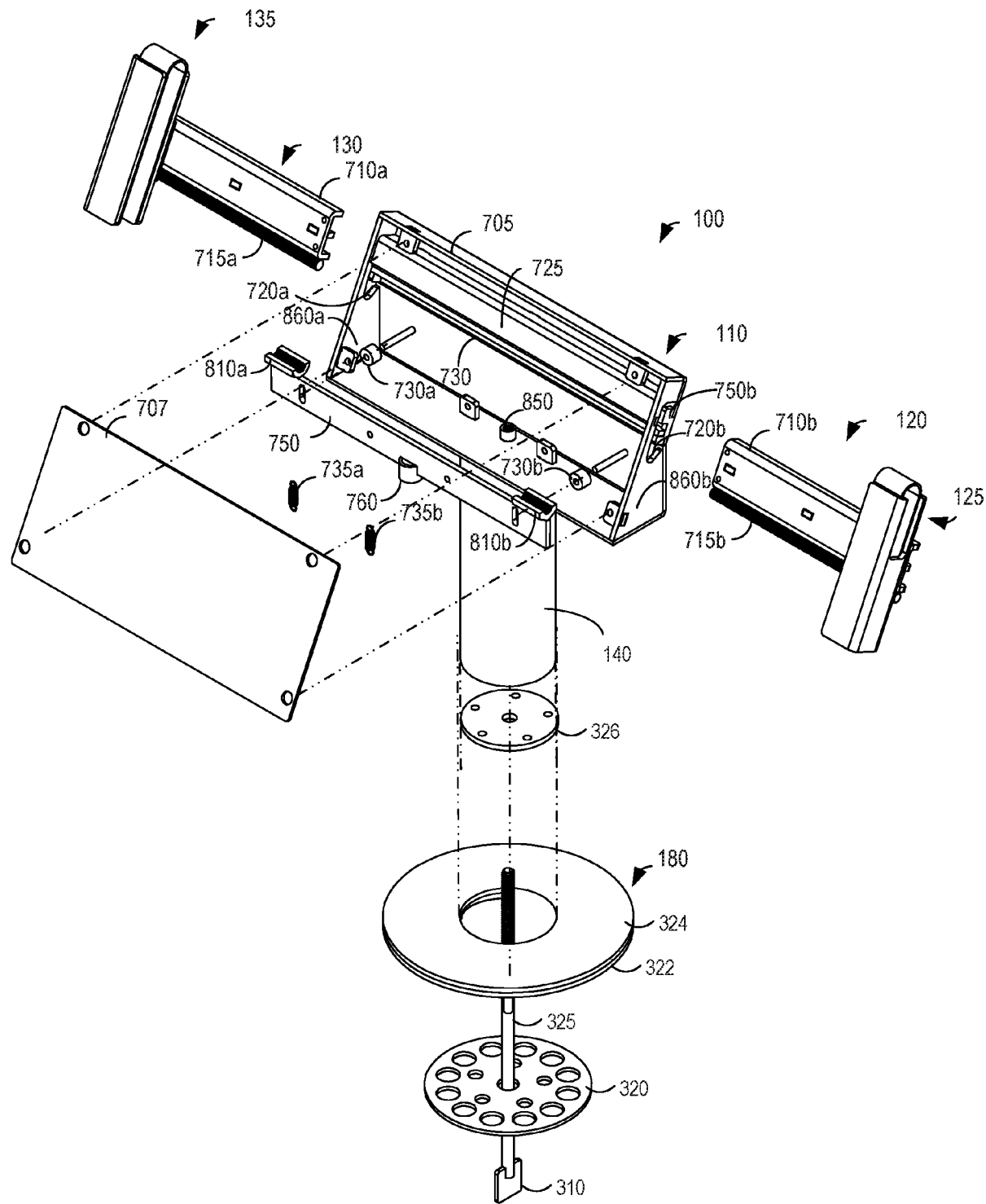
FIG. 7 is an exploded orthogonal perspective view of the security apparatus of the present technology.
Figure 8:
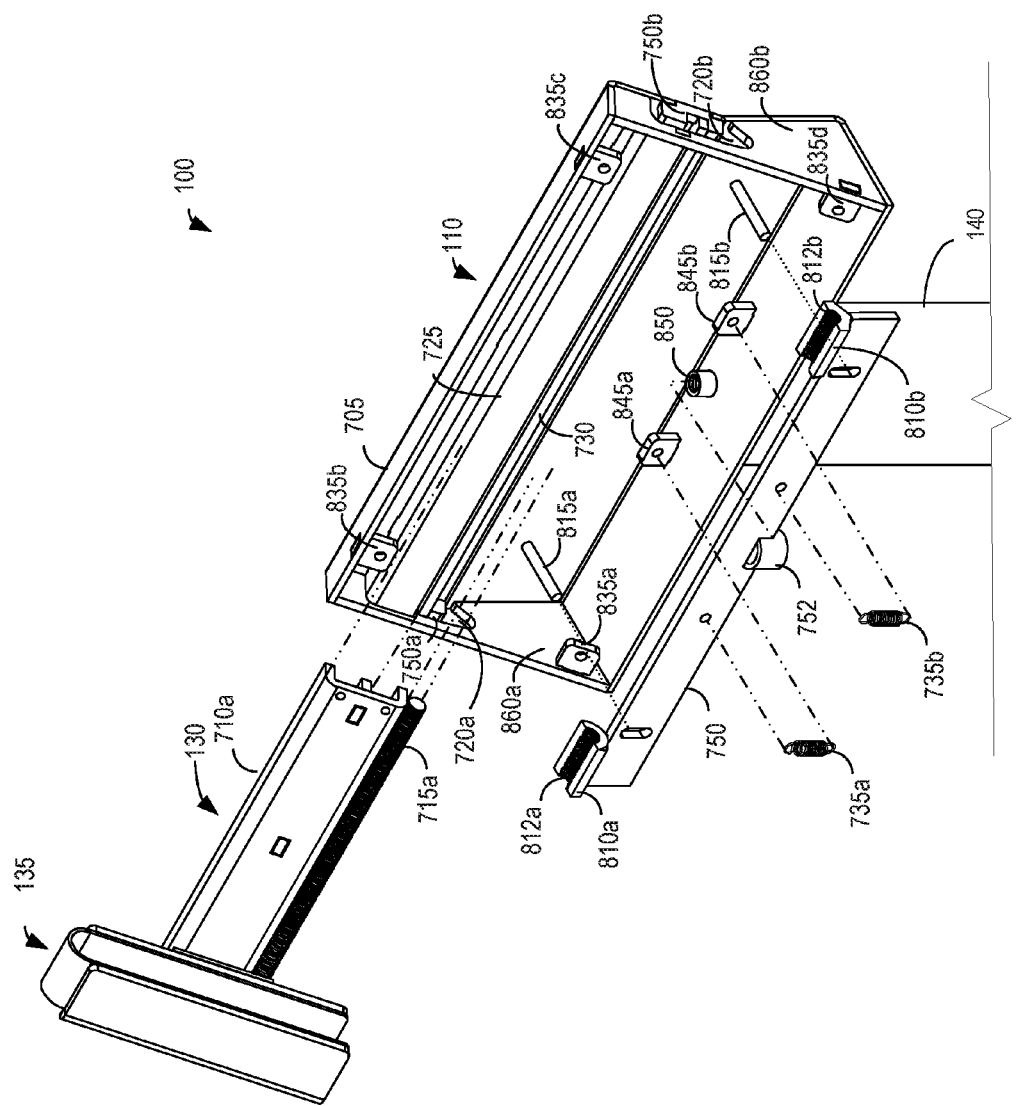
FIG. 8 is an enlarged exploded orthogonal perspective view of one securing arm and the housing assembly the security apparatus of the present technology.

Aspects of the securing assembly will be described with reference to FIGS. 7 and 8. FIG. 7 is an exploded orthogonal perspective view of the security apparatus of the present technology. FIG. 8 is an enlarged exploded orthogonal perspective view of one securing arm and the housing assembly the security apparatus of the present technology. Certain reference numbers (such as those for tabs 835a – 835d) appear only in FIG. 8 in order to not unduly obscure portions of either of the FIGs.

As illustrated in FIGS. 7 and 8, a housing assembly 110 includes a main body housing 705 which is attached to post 140 by, for example, welding the post 140 to a portion of the housing 705. Housing 705 includes a guide rail 730 upon which a corresponding rail in each of arm assemblies 120, 130 slides as the arm assemblies enter the body housing. Two side panels 860a and 860b include arm openings 720a and 720b, respectively, through which the arm assemblies 120, 130 enter the housing assembly 110. The arm openings 720a and 720b are sized to allow both the arm channels 710a, 710b and accompanying threaded rods 715a, 715b to enter the housing 705 of the housing assembly 110. A top rail 725 is positioned as a second guiding member for the arm assemblies 120, 120, such that each arm channel 710a, 710b is positioned with one side adjacent to the guide rail 730 and the other adjacent to the top rail 725. (As illustrated in FIG. 3, each arm assembly 120, 130 is free to slide into and out of the housing assembly 110. This allows any different size of laptop to be secured between the respective end assemblies 125 and 135.) In one embodiment, the arm assemblies 120, 130 and end assemblies 125, 135 are manually slid back and forth into and out of the housing assembly 110. In alternative embodiments, a mechanical adjustment mechanism may be utilized to move the arms in and out of the housing assembly 110.

Housing assembly 110 also includes trapping member including a trapping rail 750 and coupling nuts 810a, 810b. The trap rail 750, as described below, is carried on a securing rod 325 which moves the trap rail 750 up and down in the housing so that two coupling nuts 810a and 810b can engage each of the threaded rods 715a and 715b. The trap rail 750, securing rod 325 and coupling nuts 810a and 810b may comprise a locking assembly. The coupling nuts 810a and 810b may be attached to the trap rail 750 by welding or other means. Each coupling nut 810a and 810b includes a threaded section (812a, 812b shown in FIG. 11A) having the same pitch as each of the threaded rods 715a and 715b. This threaded section allows each of the coupling nuts to mate with the threaded rods when the threaded rods and the arm assemblies 120, 130 are in the desired position surrounding a laptop, and thereby lock the position of the assemblies 120, 130. As illustrated in other figures, the trap rail 750 engages the security rod 325 which is provided within the post 140 and exits a threaded weld nut 850 in the body housing 705. The trap rail 750 includes a cylindrical cowling 752 which slides over a weld nut 850. The cowling 752 of trap rail 750 allows rotation of rod 325. Trap rail 750 includes two slots which engage guideposts 815a and 815b. In one embodiment, guideposts 815a and 815b are threaded posts, allowing a bolt or other type of fastener to secure the trap rail 750, while still allowing upward and downward movement of the guide rail 750. The slots and guideposts 815a, 815b maintain the orientation of the trap rail as the rail is moved upward and downward by the rod 312. Two springs 735a, and 735b have one end attached to the trap rail 750 and another end attached to mounting posts 845a and 845b. Springs 735a, 735b ensure that the trap rail 750 disengages the threaded rods 715a, 715b when the rod 325 rotates to lower the rail away from the threaded rods.

A cover plate 707 is securable to the main body housing 705 to protect the above components. Cover plate 707 may be secured by suitable fasteners (screws) connecting the cover plate to mounting tabs 835a - 835d.

Figure 4:
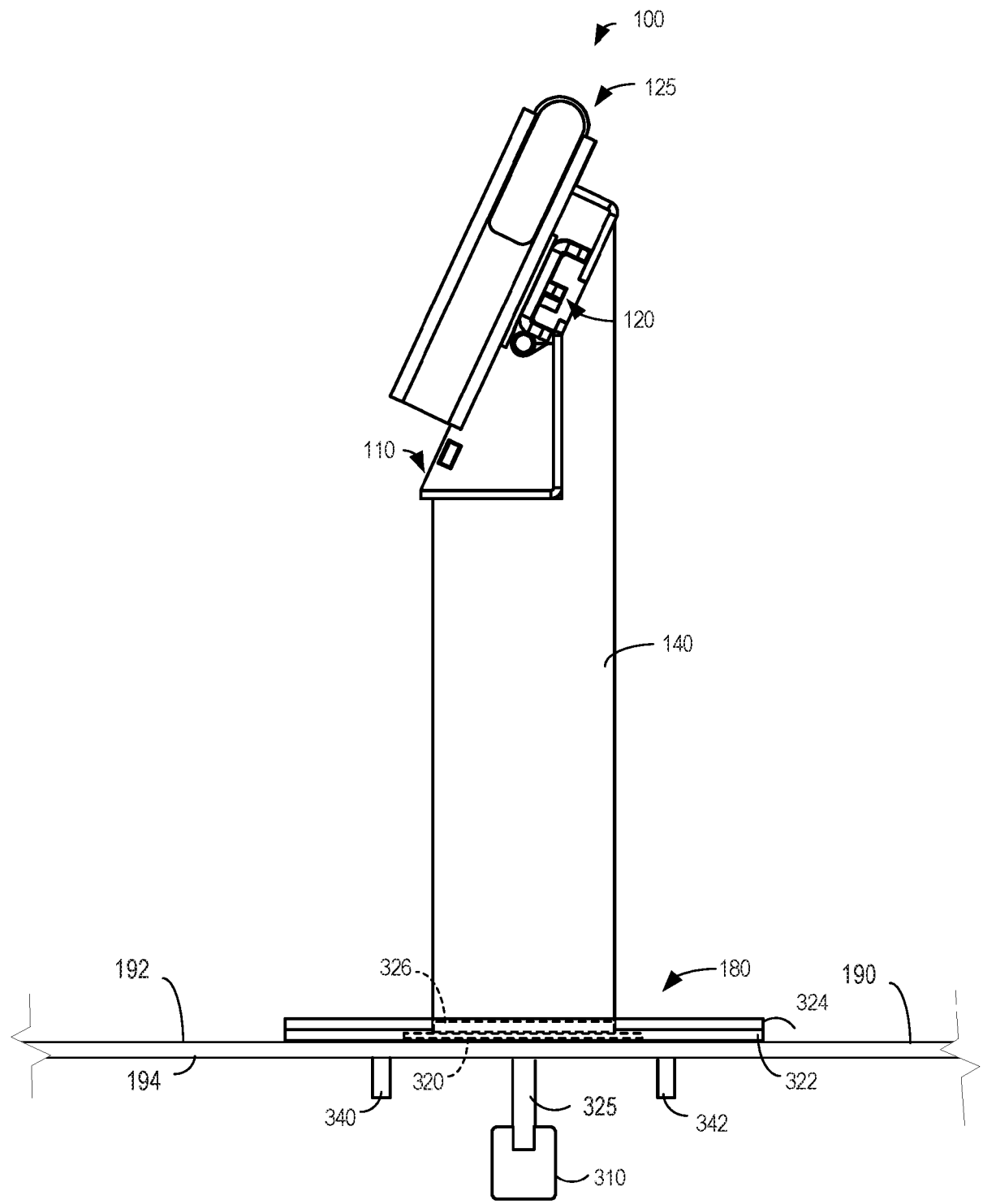
FIG. 4 is a side view (along line 4 – 4 of FIG. 3.) of the security apparatus according to an embodiment of the present technology.

Also illustrated in FIG. 7 is the securing rod 325 and mount assembly 180. With reference to FIG. 7 and FIGS. 3 and 4, the mount assembly 180 comprises a top ring 324 a bottom ring 322, a bottom disc 326 and a base rotating disc 320. The top ring 324 and a bottom ring 322 each have a central opening allowing both rings to slide onto the outer surface of post 140. Each of the bottom disc 326 and base rotating disc 320h as a center hole having a size sufficient to allow the securing rod to pass therethrough without resistance. The bottom ring 322 includes one or more fasteners 340, 342 (such as threaded screws or threaded rods secured to the bottom ring) which are designed to pass through the body 190 to which the security apparatus is attached. The fasteners may be secured to the side of the body 190 opposing the side on which ring 322 is positioned. Bottom disc 326 is secured inside the base of post 140 (as shown in FIG. 4) by means such as welding. The bottom disc 326 is installed in the base of post 140 prior to securing the security apparatus 100 to a body 190. Body 190 may be a board, table or other planar structure having an upper (or top) surface 192 and a lower (or bottom) surface 194 (illustrated in FIG. 4). Base rotating disc 320 is secured to the bottom disc 326 by one or more fasteners (screws, bolts or other fasteners). Base rotating disc 320 is designed to rest on a top surface 192 of body 190.

To secure the security apparatus 100 to body 190, the components of the security apparatus 100 are first assembled into a completed form, with the exception of rings 322 and 324, and base rotating disc 320. When ready for final mounting to body 190, a hole having a size sufficient to allow the securing rod 315 to pass through body 190 is formed at the location where mounting of the apparatus 100 is to occur. Rings 324 and 322 are next slid onto the post 140, after which base rotating disc 320 is secured to the bottom disc 326 (thus preventing rings 322 and 324 from being removed from post 140). The base rotating disc 320 is attached to the bottom of the apparatus by securing the base rotating disc 320 to the bottom disc 326 using, for example, metal screws or other suitable fasteners. The apparatus 100 is then positioned so that the securing rod 325 passes through the hole formed in the body 190, ensuring that the rod protrudes through the body 190 to a side opposite the side where the apparatus 100 is mounted. Smaller diameter holes are formed in body 190 to accommodate the fasteners associated with bottom ring 322. Bottom ring 322 is then slid adjacent to the base rotating disc 320 and bottom ring 322 secured to body 190 by passing the fasteners associated with bottom ring 322 through the body (from top surface 192 though to bottom surface 194) and securing them on the bottom surface 194 of body 190. A paddle 310 may thereafter be attached to securing rod 325 to provide easier, hand rotation of the rod 325. The paddle 310 may alternatively be attached to the securing rod 325 before installation of the security apparatus. In one embodiment, the fasteners associated with bottom ring 322 may be bolts and pre-drilled holes formed to pass the bolts through the body. In another embodiment, the fasteners may comprise wood or metal self-drilling screws. The top ring 324 can then be slid into abutment with the bottom ring 322 to provide a clean finish to the surface of the security apparatus adjacent to the surface of the body 190.

Once mounted, the security apparatus can rotate about a center axis (formed on the center of the length of the securing rod 325) to allow rotation of the laptop display. In alterative embodiments, other mounting forms may be used. For example, one embodiment may eliminate the use of a top ring 324 and rotating base disc 320, which in turn could eliminate the need for a bottom disc 326.

Figure 9A:
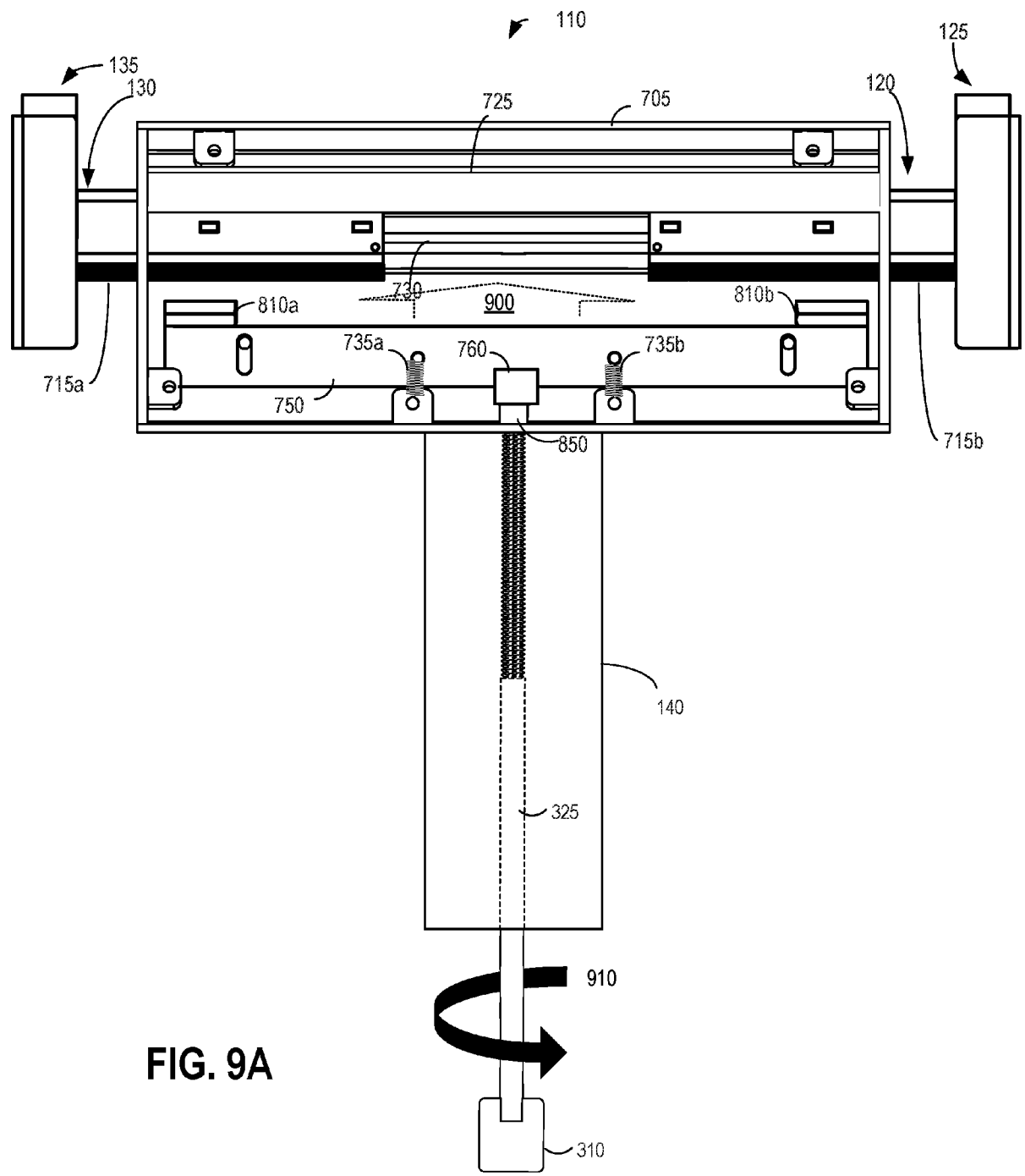
FIGS. 9A and 9B are partially disassembled, front views of the security apparatus according to an embodiment of the present technology showing movement of the trap rail and coupling nuts under the control of rotation of the securing rod.
Figure 9B:
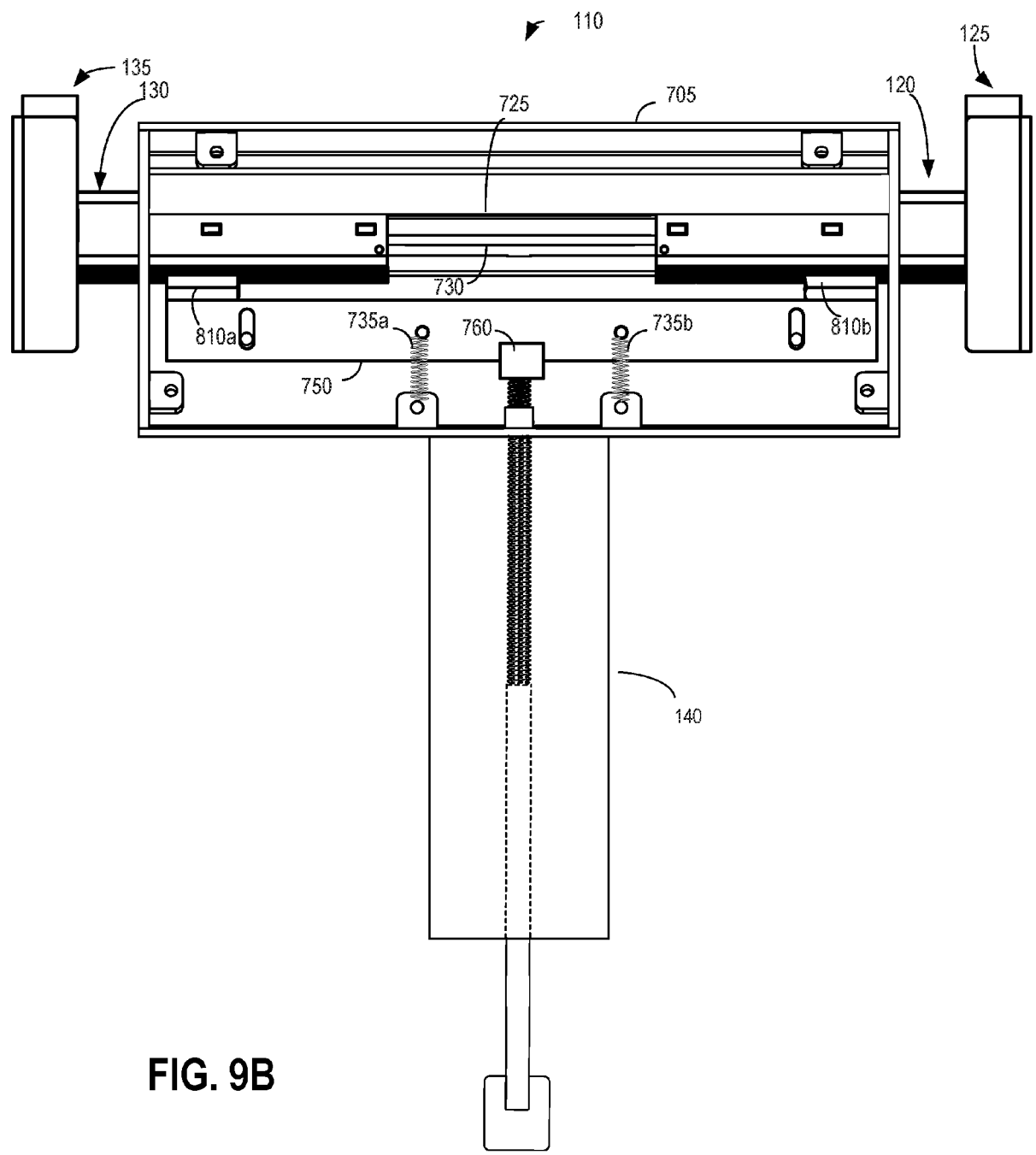
Figure 10:
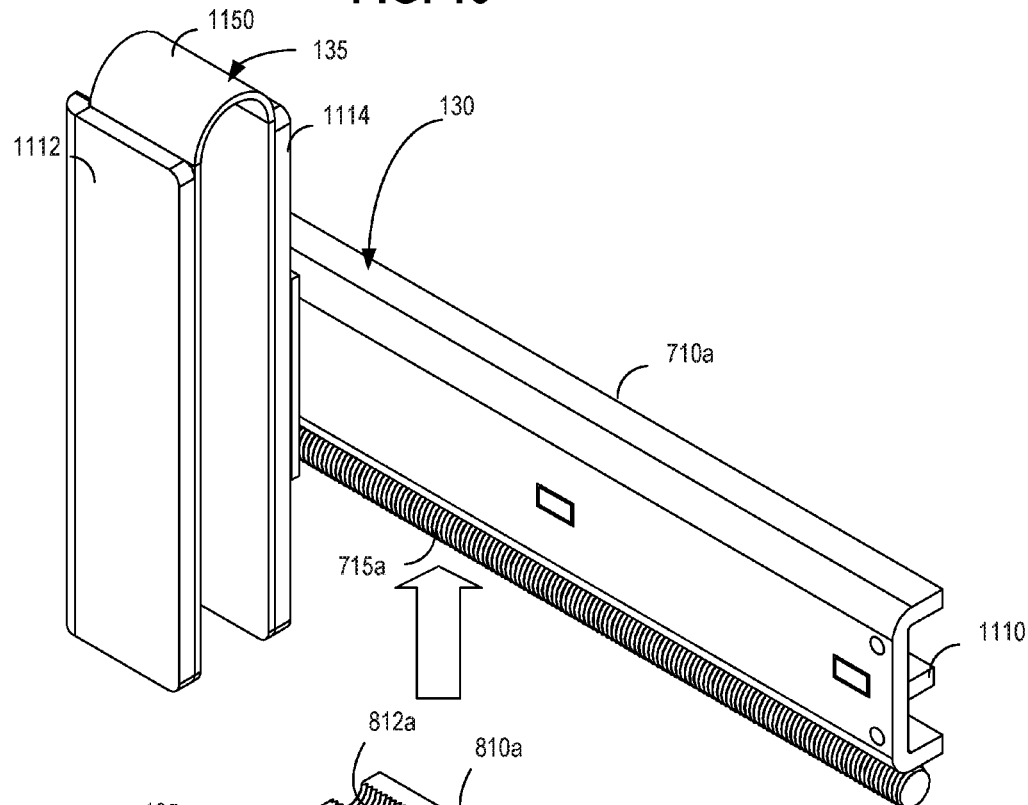
FIG. 10 is a partially disassembled, orthogonal view of the arm assembly and the trap rail with coupling nuts.

FIGS. 9A, 9B and 10 illustrate the use of the securing rod 325 to move the trap rail 750 and coupling nuts 310a, 310b into engagement with the threaded rods 715a, 715b to secure the arm assemblies 120, 130 from movement. Once installed, the securing rod 325, with paddle 310 attached thereto, will be generally out of sight since it is positioned under the lower surface 194 of body 190. The securing rod 325 includes a threaded section which passes through and is held in place by a threaded bore in weld nut 850 (positioned at the bottom of main body housing 705). The threaded end of securing rod 325 is received in a guide tube 760 of the trap rail 750. After the laptop is positioned between end assemblies 125, 135 (or at any other time it is desirable to secure the arm assemblies 120, 130, securing rod 325 is rotated in the direction of arrow 900 (FIG. 9A) so that the securing rod pushes trap rail 750 with coupling nuts 810a, 810b into engagement with the threaded rods 715a, 715b as illustrated in FIG. 9B. Each coupling nut 810a, 810b had a threaded concave region 812a, 812b (illustrated in FIG. 8 and in enlarged form in FIG. 10) formed to engage the threaded rods 715a, 715b. Each coupling nut 810a, 810b engages a respective one of threaded rods 715a, 715b, thereby securing the position of the arm assemblies 120, 130 (and end assemblies 125, 135). To release the arm assemblies 120, 120, securing rod 325 is rotated in the opposite direction. Springs 735a, 735b exert a downward force on the trap rail 750 so that, when the securing rod 325 is rotated in the direction opposite to arrow 910 to release the arm assemblies 120, 130, the trap rail and coupling nuts 810a and 810b disengage from the threaded rods 715a, 715b.

Figures 11A, 11B:
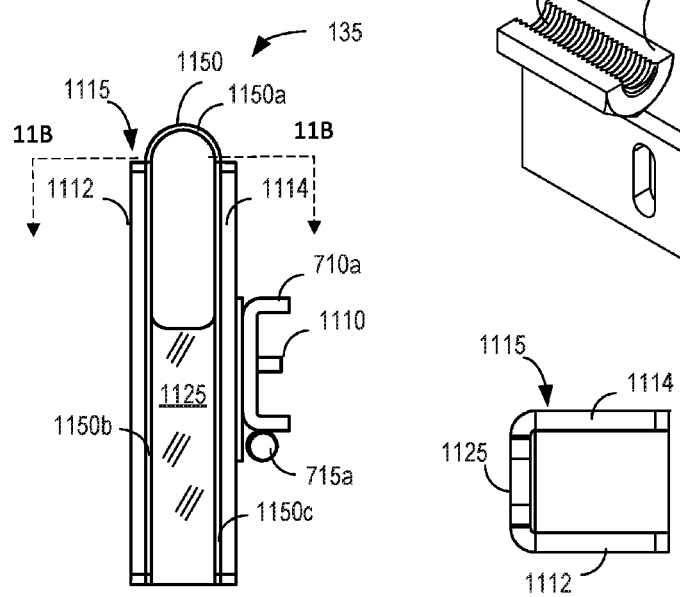
FIG. 11A is an end view of an end assembly of the present technology.
FIG. 11B is a top view along line 11B - 11B in FIG. 11A.

FIGS. 10, 11A and 11B also show aspects of the end assembly 135. Each end assembly 125, 135 is mounted on an arm assembly 120, 130. Each end assembly includes an arm channel 1150 and an outer corner support 1115. Arm channel 1150 is a (down-facing in FIG. 11A) u-shaped clip having an arcuate top section 1150a joining a first side 1150b and second side 1150c which engage the top side and side edge of the lower portion of laptop 500 as illustrated in FIG. 5. The corner support also has a u-shaped cross-section (FIG. 11B formed by walls 1112, 1114 and back wall 1125. Walls 1112 and 1114 and surround and supports arm channel 1150. The arcuate top section 1150a of the arm channel 1150 is designed to engage a convertible laptop 500 in the aforementioned gap 600 between the upper body region 510 and the lower body region 520 adjacent to one side of the laptop, with the back wall 1125 engaging the side of the lower portion when then arms are moved to engage the lower portion. As such, the arcuate top section 1150a, when assembled with the outer corner support 1115, has a notably thinner thickness than the outer corner support so as to not unduly restrict rotation of the upper body region 510 relative to the lower body region 520. The arm channel 1150 and outer corner support 1115 may be made in various sizes to accommodate laptops of various sizes.

Figure 12:
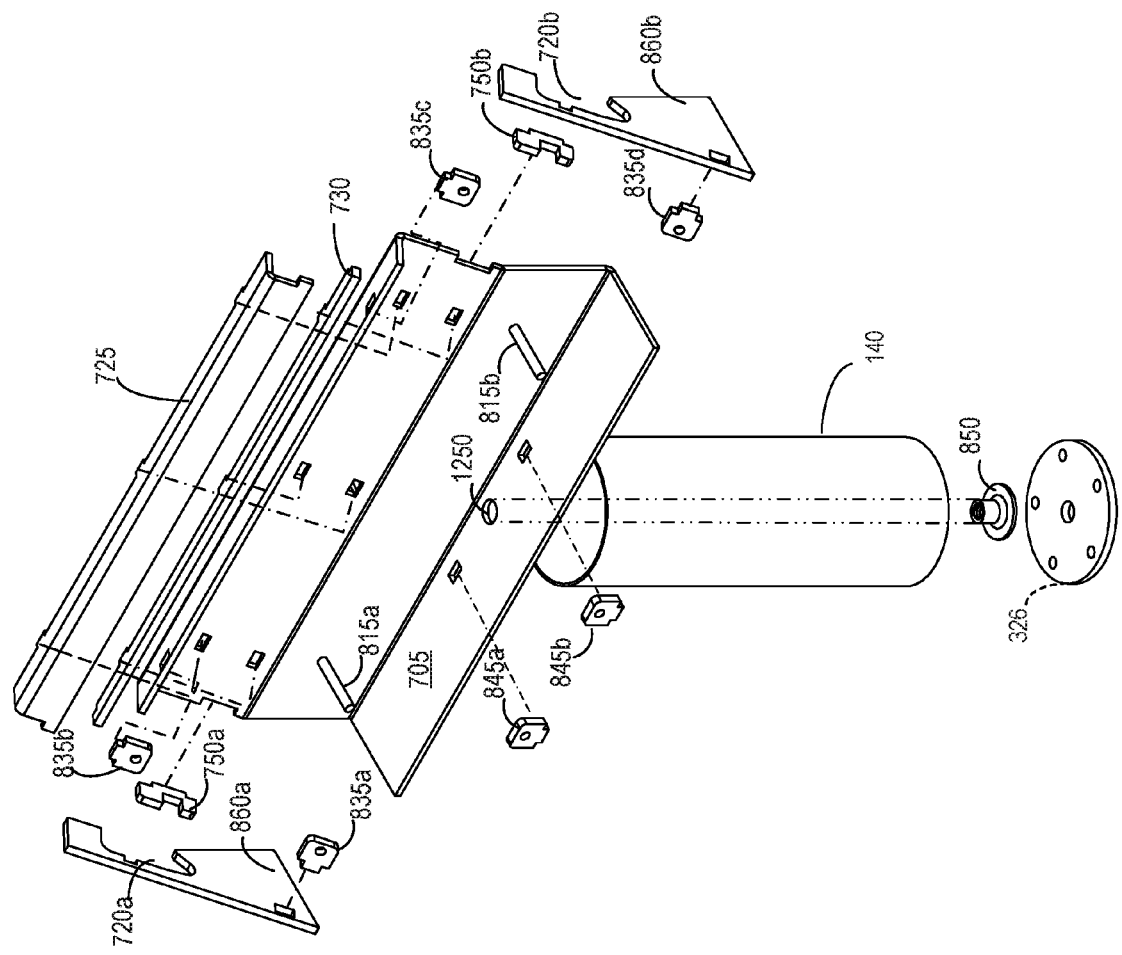
FIG. 12 is an exploded, partial orthogonal view of the housing assembly, post, and bottom disc of the present technology.

FIG. 12 is a partially exploded view of the housing assembly. FIG. 12 illustrates the assembly of the main body housing 705, certain components of the housing assembly, and the weld nut 850. As illustrated in FIG. 12, the main body housing 705 includes various slots in which certain previously described components are mounted. Guideposts 815a, 815b may be fixed in the main body housing 705. Weld nut is inserted in bore 1250 and may be welded therein. Mounting tabs 835b - 835c, and 845a, 845b are secured in respective slots in main body housing 705 as illustrated in FIG. 12. Two side panels 860a and 860b include slots for mounting tabs 835a and 835d, as well as small slots in arm openings 720a and 720b which engage corresponding tabs on top rail 725. Similarly, both the guide rail 730 and top rail 725 have tabs which are inserted in corresponding slots in the main body housing 705. Each of mounting tabs 835a – 835d, top rail 725, and guide rail 730 has a tab portion that may be inserted into a corresponding slot in housing 705. Rail guides 750a and 750b similarly have tabs that are inserted into corresponding slots in housing 705.

Each of the components the security apparatus 100 including housing assembly 110, arm assemblies 120 and 130, assemblies 125 and 135, post 140, and mount assembly 180 may be manufactured from stainless steel by, for example, machining the steel to form the components. It should be understood that the technology may be manufactured using other materials which are sufficiently strong to secure the secured object in accordance with the present teachings.

The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality.

The terms "top" and "bottom," "upper" and "lower" and "vertical" and "horizontal" as may be used herein are by way of example and illustrative purposes only, and are not meant to limit the description of the invention inasmuch as the referenced item can be exchanged in position and orientation. Also, as used herein, the terms "substantially" and/or "about" mean that the specified dimension or parameter may be varied within an acceptable manufacturing tolerance for a given application. In one embodiment, the acceptable manufacturing tolerance is ± 2.5%.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, without additional context, use of numerical terms such as a "first" object, a "second" object, and a "third" object may not imply an ordering of objects, but may instead be used for identification purposes to identify different objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A security apparatus configured to secure a secured object on a mounting surface, the security apparatus comprising:
   a housing assembly;
   a first arm assembly and a second arm assembly extending from and retractable relative to the housing assembly;
   a first end assembly mounted to the first arm assembly, and a second end assembly mounted to the second arm assembly, the first end assembly configured to receive a first side of a lower body portion of the secured object, and the second end assembly configured to receive a second side of the lower body portion of the secured object, each said end assembly including a respective channel having a respective arcuate top portion sized for placement between an upper body portion and the lower body portion of the secured object;
a support housing supporting the housing assembly, the first and second arm assemblies, and the first and second end assemblies on the mounting surface;
a trapping member positioned in the housing assembly; and
a locking rod having a first end extending outside the support housing and a second end extending into the housing assembly and into engagement with the trapping member, the locking rod configured to move the trapping member into engagement with the first and second arm assemblies;
wherein the first end of the locking rod extends downward from the support housing, such that when the security apparatus secures the secured object on the mounting surface the first end of the locking rod extends below a bottom side of the mounting surface.

2. The security apparatus of claim 1, wherein the locking rod is configured to move the trapping member into engagement with the first arm assembly and the second arm assembly when the locking rod is rotated.

3. The security apparatus of claim 2 wherein the locking rod includes a threaded region extending from the second end of the locking rod toward the first end of the locking rod, the threaded region received in a threaded bore in the housing assembly, the threaded bore being adjacent to the trapping member, the second end of the locking rod extending though the threaded bore into a guide tube on the trapping member.

4. The security apparatus of claim 1 wherein the first end of the locking rod, which extends below the bottom side of the mounting surface when the security apparatus secures the secured object on the mounting surface, includes a paddle.

5. The security apparatus of claim 1 wherein each said arm assembly includes a respective threaded rod, and wherein the housing assembly includes a guide rail, each said arm assembly being slidably received into the housing assembly though a respective opening in the housing assembly and along the guide rail.

6. The security apparatus of claim 1 wherein each said arm assembly includes a respective threaded rod, and wherein the trapping member comprises a trapping rail including a first coupling nut and a second coupling nut, the first coupling nut attached to the trapping rail at a first end of the trapping rail and the second coupling nut attached to the trapping rail at a second end of the trapping rail, each said coupling nut including a concave threaded region having a pitch matching a pitch of each said threaded rod.

7. A security apparatus configured to secure a secured object on a mounting surface, the security apparatus comprising:
a housing assembly;
a first arm assembly and a second arm assembly extending from and retractable relative to the housing assembly;
a first end assembly mounted to the first arm assembly, and a second end assembly mounted to the second arm assembly, the first end assembly configured to receive a first side of a lower body portion of the secured object, and the second end assembly configured to receive a second side of the lower body portion of the secured object, each said end assembly including a respective channel having a respective arcuate top portion sized for placement between an upper body portion and the lower body portion of the secured object;
a support housing supporting the housing assembly, the first and second arm assemblies, and the first and second end assemblies on the mounting surface;
a trapping member positioned in the housing assembly; and
a locking rod having a first end extending outside the support housing and a second end extending into the housing assembly and into engagement with the trapping member, the locking rod configured to move the trapping member into engagement with the first and second arm assemblies;
wherein each said end assembly includes a respective u-shaped channel member defining the channel and including the arcuate top portion, and a corner member having a u-shaped cross-section oriented 90 degrees relative to the u-shaped channel member and surrounding the u-shaped channel member, the corner member forming a wall positioned to engage one of the first side or the second side of the lower body portion.

8. The security apparatus of claim 7 wherein the locking rod is configured to move the trapping member into engagement with the first and second arm assemblies when the locking rod is rotated in a first direction and move the trapping member away from the first and second arm assemblies when the locking rod is rotated in a second direction.

9. A security apparatus configured to secure a convertible laptop to a surface, the convertible laptop having an upper body portion and a lower body portion coupled by a hinge, the hinge designed to allow the upper body portion to rotate nearly 360° about the hinge, the security apparatus comprising:
a securing assembly comprising
first and second arm assemblies each having a respective end assembly configured to receive a respective one of a first side and a second side of the lower body portion of the convertible laptop, each said end assembly including a respective channel having an arcuate top portion sized for placement within a gap between an upper body portion and the lower body portion of the convertible laptop; and
a locking assembly engaging the securing assembly, the locking assembly comprising
a trapping member positioned adjacent to at least a portion of the first and second arm assemblies; and
a locking rod having a first end extending below the surface and a second end extending into engagement with the trapping member, the locking rod configured to move the trapping member into engagement with the first and second arm assemblies.

10. The security apparatus of claim 9 wherein the locking rod is configured to move the trapping member into engagement with the first and second arm assemblies when the locking rod is rotated in a first direction and move the trapping member away from the first and second arm assemblies when the locking rod is rotated in a second direction.

11. The security apparatus of claim 10 wherein the securing assembly includes a housing assembly, and wherein locking rod includes a threaded region extending from the second end of the locking rod toward the first end of the locking rod, the threaded region received in a threaded bore in the housing assembly, the threaded bore being adjacent to the trapping member, the second end of the locking rod extending though the threaded bore into a guide tube on the trapping member.

12. The security apparatus of claim 10 wherein the securing assembly is provided in a housing, the security apparatus further including a support housing mounted on the surface, the securing assembly mounted on the support housing, the locking rod having a first end extending outside the support housing and below the surface and a second end extending into the housing and into engagement with the trapping member.

13. The security apparatus of claim 12 wherein the support housing includes a mounting assembly securing the support housing to the surface, the mounting assembly including a rotating ring at a base of the support housing and abutting the surface when the security apparatus is secured to the surface, and a fastener ring positioned over the rotating ring and having one or more fasteners protruding through the surface to secure the support housing to the surface.

14. The security apparatus of claim 13 wherein the trapping member comprises a trapping rail including first and second coupling nuts, the first coupling nut attached to the trapping rail at a first end of the trapping rail and the second coupling nut attached to the trapping rail at a second end of the trapping rail, each said coupling nut including a threaded region having a pitch matching a pitch of a respective threaded rod carried on each said arm assembly.

15. The security apparatus of claim 9 wherein each said arm assembly includes a respective threaded rod associated with the arm assembly.

16. The security apparatus of claim 9 wherein each said end assembly includes a u-shaped channel member defining the channel and including the arcuate top portion, and a corner member having a u-shaped cross-section oriented 90 degrees relative to the u-shaped channel member and surrounding the channel member, the corner member forming a wall positioned to engage one of the first side or the second side of the lower body portion.

17. A security apparatus configured to secure a laptop on a mounting surface, the security apparatus comprising:
a housing;
a first arm and a second arm extending from and retractable into the housing, the first arm including a first threaded rod, and the second arm including a second threaded rod;
a first end channel mounted to the first arm, and a second end channel mounted to the second arm, the first end channel configured to receive a first side of a lower body portion of the laptop, the second end channel configured to receive a second side of the lower body portion of the laptop, a portion of each said end channel being sized for placement between an upper body portion of the laptop and the lower body portion of the laptop;
a base supporting the housing, the first and second arms, and the first and second end channels on the mounting surface;
a trapping member positioned in the housing; and
a locking rod having a first end extending outside the housing and below the mounting surface and a second end extending into the housing and into engagement with the trapping member, the locking rod configured to move the trapping member into engagement with the first and second arms.

18. The security apparatus of claim 17 wherein the locking rod is configured to move the trapping member into engagement with the first and second threaded rods when the locking rod is rotated in a first direction and move the trapping member away from the first and second threaded rods when the locking rod is rotated in a second direction.

19. The security apparatus of claim 18 wherein the locking rod includes a threaded region extending from the second end of the locking rod toward the first end of the locking rode, the threaded region received in a threaded bore in the housing, the threaded bore being adjacent to the trapping member, the second end of the locking rod extending though the threaded bore into a guide tube on the trapping member.

20. The security apparatus of claim 19 wherein the trapping member comprises a trapping rail including first and second coupling nuts, the first coupling nut attached to the trapping rail at a first end of the trapping rail and the second coupling nut attached to the trapping rail at a second end of the trapping rail, each said coupling nut including a concave threaded region having a pitch matching a pitch of the first and second threaded rods.

* * * * *